United States Patent
Haruta et al.

(10) Patent No.: US 9,352,508 B2
(45) Date of Patent: May 31, 2016

(54) THERMALLY SHRINKABLE POLYESTER FILM, METHOD OF MANUFACTURING THE SAME, AND PACKED PRODUCT USING THE SAME

(75) Inventors: Masayuki Haruta, Tsuruga (JP); Yukinobu Mukoyama, Tsuruga (JP); Katsuhiko Nose, Osaka (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 643 days.

(21) Appl. No.: 13/266,326

(22) PCT Filed: May 6, 2010

(86) PCT No.: PCT/JP2010/003114
§ 371 (c)(1),
(2), (4) Date: Oct. 26, 2011

(87) PCT Pub. No.: WO2010/137240
PCT Pub. Date: Dec. 2, 2010

(65) Prior Publication Data
US 2012/0043248 A1  Feb. 23, 2012

(30) Foreign Application Priority Data
May 26, 2009  (JP) ................. 2009-126776

(51) Int. Cl.
*B29C 55/14* (2006.01)
*C08J 5/18* (2006.01)
(Continued)

(52) U.S. Cl.
CPC ............... *B29C 55/14* (2013.01); *B29C 55/065* (2013.01); *B29C 55/143* (2013.01); *C08J 5/18* (2013.01);
(Continued)

(58) Field of Classification Search
CPC .......... B29K 67/00; C08J 5/18; B32B 27/36; B29C 61/00; B29C 61/003; B29C 55/14
USPC ........... 428/34.9, 35.1, 212, 480, 36.6, 36.91, 428/36.92, 34.1, 35.5, 315.5, 304.4, 35.7, 4, 428/80; 528/272, 298, 302, 308, 308.6, 528/502; 264/342, 346, 342 RE, 164, 290.2, 264/210.1, 211.13, 235, 235.6, 176.1
See application file for complete search history.

(56) References Cited

U.S. PATENT DOCUMENTS

| 5,885,501 A * | 3/1999 | Gardner et al. ............... 264/216 |
| 2005/0119359 A1* | 6/2005 | Shelby et al. ................... 521/50 |
| 2009/0304997 A1* | 12/2009 | Haruta et al. ................. 428/156 |

FOREIGN PATENT DOCUMENTS

| EP | 1 185 411 B1 | 8/2003 |
| EP | 2058357 A1 | 5/2009 |

(Continued)

OTHER PUBLICATIONS

International Bureau of WIPO, International Preliminary Report on Patentability in International Patent Application No. PCT/JP2010/003114 (Dec. 12, 2011), English translation.
(Continued)

*Primary Examiner* — Gwendolyn Blackwell
*Assistant Examiner* — Lee Sanderson
(74) *Attorney, Agent, or Firm* — Leydig, Voit & Mayer, Ltd.

(57) ABSTRACT

There is provided a thermally shrinkable polyester film where the opening ability along the perforation is very good. A thermally shrinkable polyester film comprising polyester resin in which ethylene terephthalate is a main constituting component and not less than 13 molar % of one or more monomer component(s) which can become non-crystalline component is/are contained in the total polyester resin components, wherein the film has specific thermally shrinking characteristics and specific mechanical characteristics after thermal shrinking treatment.

17 Claims, 1 Drawing Sheet

(51) Int. Cl.
  *B29C 55/06*   (2006.01)
  *B29C 63/42*   (2006.01)
  *B29K 67/00*   (2006.01)

(52) U.S. Cl.
  CPC ........... *B29C 63/423* (2013.01); *B29K 2067/00* (2013.01); *B29K 2995/0049* (2013.01); *C08J 2367/02* (2013.01)

(56) References Cited

FOREIGN PATENT DOCUMENTS

| JP | 2002-363312 A | 12/2002 |
|----|---------------|---------|
| JP | 2008-274160 A | 11/2008 |
| JP | 2009-073145 A | 4/2009 |
| JP | 2009-202445 A | 9/2009 |
| JP | 2009-226939 A | 10/2009 |
| JP | 2009-227337 A | 10/2009 |
| JP | 2009-227970 A | 10/2009 |
| WO | WO 2008/026530 A1 | 3/2008 |
| WO | WO 2008026530 A1 * | 3/2008 |
| WO | WO 2009/075312 A1 | 6/2009 |

OTHER PUBLICATIONS

European Patent Office, Extended European Search Report in European Application No. 10780202.7 (Apr. 4, 2013).
Japanese Patent Office, International Search Report in International Application No. PCT/JP2010/003114 (Aug. 3, 2010).
Chinese Patent Office, Office Action in Chinese Patent Application No. 201080022756.6 (May 21, 2014).

* cited by examiner

THERMALLY SHRINKABLE POLYESTER FILM, METHOD OF MANUFACTURING THE SAME, AND PACKED PRODUCT USING THE SAME

TECHNICAL FIELD OF THE INVENTION

The present invention relates to a thermally shrinkable polyester film, to a method of manufacturing the same and a packed product using the same. More particularly, it relates to a thermally shrinkable polyester film suitable for use as a label, to a method of manufacturing the same and a packed product using the label.

BACKGROUND ART

In recent years, stretched films made of polyvinyl chloride resin, polystyrene resin, polyester resin or the like (the so-called thermally shrinkable film) have been widely used for the use of label packaging, cap seal, accumulated packaging, etc. having both roles for protection of glass bottles, PET bottles, etc. and for indication of products. Among the thermally shrinkable films as such, a polyvinyl chloride film has disadvantages of low heat resistance, generation of hydrogen chloride gas upon burning or cause of dioxin generation. A polystyrene film has such disadvantages that its resistance to solvents is poor, an ink having a specific composition should be used in the printing and it is to be burned at high temperature whereby a lot of black smoke with bad smell is generated upon burning. Therefore, a thermally shrinkable film of a polyester type having high heat resistance, easy burning characteristics and excellent resistance to solvents has been widely utilized as a shrinkable label and, as a result of an increase in the distribution amount of PET containers, there has been a tendency that its using amount is increasing.

Further, as to a thermally shrinkable film, that which is greatly shrunk in the widthwise direction has been commonly used in view of handling in the manufacture of labels. Therefore, the conventional thermally shrinkable polyester film has been manufactured by stretching in the widthwise direction with a high magnification for expressing a sufficient shrinking force in the widthwise direction during heating.

However, in the conventional thermally shrinkable polyester film, almost no stretching is done in the lengthwise direction intersecting at right angles to the main shrinking direction. Therefore, there is an inconvenience that its mechanical strength is low and, when it is coated on a PET bottle or the like as a label by shrinking, the label cannot be easily torn off along a perforation (or, in other words, its opening ability along the perforation is poor). Further, when the film is stretched in a lengthwise direction during the manufacture for making the opening ability along the perforation for the thermally shrinkable polyester film better, although the mechanical strength becomes high and the opening ability along the perforation is improved to some extent, the shrinking force is expressed in the lengthwise direction. Therefore, when it is coated on a PET bottle or the like as a label by shrinking, there is resulted an inconvenience that the appearance (finish upon the shrinking) becomes very bad.

In view of the above, there has been a proposal for a method of improving the opening ability along the perforation for the thermally shrinkable polyester film where an incompatible thermoplastic resin is mixed with the main materials for the thermally shrinkable polyester film (see Patent Document 1). According to the method of the Patent Document 1, although the opening ability along the perforation for the thermally shrinkable polyester film can be improved to some extent, it is hard to say that a thermally shrinkable polyester film having a sufficient opening ability along the perforation is surely prepared thereby. Further, even when the method of the Patent Document 1 is adopted, it is only possible to stretch merely in the widthwise direction during the manufacture whereby it is impossible to manufacture the thermally shrinkable polyester film in a good yield.

PRIOR ART DOCUMENT

Patent Document

Patent Document 1: Japanese Patent Application Laid-Open (JP-A) No. 2002-363312

DISCLOSURE OF THE INVENTION

Problem that the Invention is to Solve

The present invention has been created for solving the above problems in the conventional thermally shrinkable polyester film and an object of the present invention is to provide a thermally shrinkable polyester film where the opening ability along the perforation is very good and the productivity is quite high.

Means for Solving the Problem

The first invention of the present invention is a thermally shrinkable polyester film, comprising: a polyester resin in which ethylene terephthalate is a main constituting component and not less than 13 molar % of one or more monomer component(s) which can become non-crystalline component is/are contained in the total polyester resin components, wherein the thermally shrinkable polyester film fulfills the following requirements (1) to (4):

(1) difference in the thermal shrinking rate in hot water in the widthwise direction of the film when treated in hot water of 80° C. for 10 seconds and for 3 seconds is 3% to 15%;

(2) thermally shrinking rate in hot water in the widthwise direction and in the lengthwise direction when treated in hot water of 90° C. for 10 seconds are 40% to 80% and 0% to 12%, respectively;

(3) right-angle tear strength in the lengthwise direction per unit thickness after shrunk to an extent of 10% in the widthwise direction in hot water of 80° C. is 180 N/mm to 310 N/mm; and (4) tensile breaking strength in the lengthwise direction is 90 MPa to 300 MPa.

Preferred embodiments of the first invention of the present invention are as follows.

(1) When the Elmendorf tear loads in the widthwise and the lengthwise directions after shrunk to an extent of 10% in the widthwise direction in hot water of 80° C. were measured, the Elmendorf ratio is 0.3 to 1.5;

(2) Thickness is 10 μm to 70 μm and haze is 2.0 to 13.0;

(3) Dynamic friction coefficient is 0.1 to 0.55; and (4) The main component in the monomers which can become non-crystalline component in the total polyester resin components is any of neopentyl glycol, 1,4-cyclohexane dimethanol and isophthalic acid.

The second invention of the present invention is a method for a continuous manufacture of the thermally shrinkable polyester film of the above first invention, characterized in including the following steps (a) to (g):

(a) a longitudinal stretching step where the non-stretched polyester film is stretched in 2.2-fold to 3.0-fold in a lengthwise direction at the temperature of Tg to (Tg+30° C.) and then stretched in 1.2-fold to 1.5-fold in a lengthwise direction at the temperature of (Tg+10° C.) to (Tg+40° C.) whereupon the longitudinal stretch is done to make the total stretching magnification 2.8-fold to 4.5-fold;

(b) an annealing step where the film after the longitudinal stretching is subjected to relax of 10% to 70% in the lengthwise direction together with heating in the widthwise direction using an infrared heater;

(c) an intermediate thermal treating step where the film after the annealing is subjected to a thermal treatment for 1.0 second to 9.0 seconds at the temperature of 130° C. to 190° C. in a state of being held by clips at the both ends in the widthwise direction in a tenter;

(d) a natural cooling step where the film after the intermediate thermal treatment is passed through an intermediate zone where it is shut out from the heating zone of each step and no positive heating operation is conducted whereupon a natural cooling is done;

(e) a compulsory cooling step where the film after the natural cooling is positively cooled down until the surface temperature reaches 80° C. to 120° C.;

(f) a lateral stretching step where the film after the compulsory cooling is stretched in 2.0-fold to 6.0-fold in a widthwise direction at the temperature of (Tg+10° C.) to (Tg+40° C.); and (g) a final thermal treating step where the film after the lateral stretching is subjected to a thermal treatment for 1.0 second to 9.0 seconds at the temperature of 80° C. to 130° C. in a state of being held by clips at both ends in the widthwise direction in a tenter.

The third invention of the present invention is a packed product which is characterized in that the thermally shrinkable polyester film of the first invention is used as a base material and a label where perforation or a pair of notches is formed on the base material is coated at least on a part of the outer surface of a thing to be packed followed by subjecting to a thermal shrinking.

Advantages of the Invention

In the thermally shrinkable polyester film of the present invention, its shrinking property in the widthwise direction which is the main shrinking direction is high, its mechanical strength is also high in the lengthwise direction intersecting at right angles to the widthwise direction, its opening ability along the perforation in making into a label is good and, upon opening, it can be neatly cut along the perforation from the beginning of the tearing until the completion thereof. Further, its stiffness (the so-called toughness) is high and the attaching adaptability when made into a label is excellent. In addition, its processing characteristic in conducting a printing process and a tubing process is good. Accordingly, the thermally shrinkable polyester film of the present invention can be advantageously used as a label for containers such as a bottle and, when used as a label, it can be very efficiently attached within short time to the container such as a bottle and, when subjected to a thermal shrinking after being attached, a good finish where wrinkles and insufficient shrinking are very small can be expressed. In addition, the label attached thereto achieves a very good opening ability along the perforation. In the packed product of the present invention, tearing of the coated label is good and the coated label can be neatly torn along the perforation with a suitable force.

Moreover, since the thermally shrinkable polyester film of the present invention is manufactured by stretching in two axes of longitudinal and lateral directions, it can be very efficiently produced.

Further, in the thermally shrinkable polyester film of the present invention, the adhesive force when back and front sides (or the same sides) are adhered to each other using a solvent is very high. Accordingly, it can be advantageously used for various kinds of coating labels such as a label for PET bottles.

BEST MODE FOR CARRYING OUT THE INVENTION

The polyester used for the thermally shrinkable polyester film of the present invention contains ethylene terephthalate as a main constituting component. Thus, it contains not less than 50 molar % or, preferably, not less than 60 molar % of ethylene terephthalate. Examples of other dicarboxylic acid component constituting the polyester of the present invention include an aromatic dicarboxylic acid such as isophthalic acid, naphthalenedicarboxylic acid or orthophthalic acid; an aliphatic dicarboxylic acid such as adipic acid, azelaic acid, sebacic acid or decanedicarboxylic acid; and an alicyclic dicarboxylic acid.

When the aliphatic dicarboxylic acid (such as adipic acid, sebacic acid or decanedicarboxylic acid) is made to contain in the polyester, its amount is preferred to be less than 3 molar %. In a thermally shrinkable polyester film prepared by using a polyester containing 3 molar % or more of such an aliphatic dicarboxylic acid, the film toughness upon a high-speed attaching is insufficient.

It is preferred that tricarboxylic and higher polycarboxylic acid (such as trimellitic acid, pyromellitic acid and anhydride thereof) is not made to contain in the polyester. In a thermally shrinkable polyester film prepared by using the polyester containing such a polycarboxylic acid, it is difficult to achieve the necessary high shrinking rate.

Examples of the diol component constituting the polyester include an aliphatic diol such as ethylene glycol, 1,3-propanediol, 1,4-butanediol, neopentyl glycol or hexanediol; an alicyclic diol such as 1,4-cyclohexanedimethanol; and an aromatic diol such as bisphenol A.

With regard to the polyester, the preferred one is that which contains one or more kind(s) of a cyclic diol (such as 1,4-cyclohexanedimethanol) and a diol having 3 to 6 carbons (such as 1,3-propanediol, 1,4-butanediol, neopentyl glycol or hexanediol) so as to adjust the glass transition point (Tg) to 60 to 80° C.

In the polyester, sum of one or more kind(s) of monomer component(s) which can become a non-crystalline component in 100 molar % of the polyhydroxyl alcohol component or in 100 molar % of the polycarboxylic acid component in the total polyester resin is not less than 13 molar %, preferably not less than 14 molar %, more preferably not less than 15 molar %, and especially preferably not less than 16 molar %. Although there is no particular limitation for the upper limit of the sum of the monomer component(s) which can become non-crystalline component, it may be 30 molar % for example. Examples of the monomer which can become non-crystalline component include neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, 1,4-butanediol and hexanediol. Among them, it is preferred to use neopentyl glycol, 1,4-cyclohexanedimethanol or isophthalic acid.

It is preferred that the polyester is not made to contain a diol having not less than 8 carbons (such as octanediol) or a trihydric or higher polyhydric alcohol (such as trimethylolpropane, trimethylolethane, glycerol or diglycerol). In a thermally shrinkable polyester film prepared by using the polyester containing such a diol or polyhydric alcohol, it is difficult to achieve the necessary high shrinking rate.

It is preferred that the polyester is not made to contain diethylene glycol, triethylene glycol and polyethylene glycol if at all possible.

If necessary, various additives such as wax, antioxidant, antistatic agent, crystal nucleus agent, viscosity-reducing agent, thermal stabilizer, pigment for coloration, coloration preventer or ultraviolet absorber may be added to the resin which forms the thermally shrinkable polyester film of the present invention. It is preferred that fine particles which make the working property (slipping property) of the film better are added as a lubricant to the resin which forms the thermally shrinkable polyester film of the present invention. Although anything may be selected as the fine particles, examples of the inorganic fine particles include silica, alumina, titanium dioxide, calcium carbonate, kaolin and barium sulfate while examples of the organic fine particles include acrylic resin particles, melamine resin particles, silicone resin particles and cross-linking polystyrene particles. An average particle size of the fine particles may be appropriately selected upon necessity from a range of 0.05 to 3.0 μm (in case of being measured using a Coulter counter).

As to a method of compounding the above particles with the resin which forms the thermally shrinkable polyester film, although it is possible, for example, to add them in any of the stages of manufacturing the polyester resin, it is preferred that the particles are added as a slurry being dispersed in ethylene glycol or the like in a stage of esterification or in a stage after completion of ester interchange and before starting the polycondensation reaction followed by proceeding the polycondensation. It is also preferred to conduct it, for example, by a method where a slurry of the particles dispersed in ethylene glycol, water or the like using a kneading extruder equipped with a vent is blended with the polyester resin materials or by a method where the dried particles and the polyester resin materials are blended using a kneading extruder.

It is also possible that the thermally shrinkable polyester film of the present invention is subjected to a corona treatment, a coating treatment or a flame treatment for making the adhesive property of the film surface better.

When the thermally shrinkable polyester film of the present invention is treated in a hot water of 90° C. for 10 seconds under an un-loaded state, the thermal shrinking rate of the film in a widthwise direction (that is, the thermal shrinking rate in hot water at 90° C. in a widthwise direction) calculated by the following formula (1) from the lengths before and after the shrinking is 40% to 80%.

Thermal shrinking rate (%)={[(Length before shrinking)−(Length after shrinking)]/[Length before shrinking]}×100    formula (1)

When the thermal shrinking rate in hot water in the widthwise direction at 90° C. is less than 40%, wrinkles and slacks are resulted in the label after the thermal shrinking due to the small shrunk amount and that is not preferred. On the contrary, when the thermal shrinkage rate in hot water in the widthwise direction at 90° C. is more than 80%, strain is apt to be resulted in the shrinkage or the so-called "jumping-up" is generated upon thermal shrinking when used as a label whereby that is not preferred. Incidentally, the lower limit of the thermal shrinking rate in hot water in the widthwise direction at 90° C. is preferred to be not less than 41%, more preferred to be not less than 43%, and especially preferred to be not less than 45%. Further, the upper limit of the thermal shrinking rate in hot water in the widthwise direction at 90° C. is preferred to be not more than 75%, more preferred to be not more than 70%, and especially preferred to be not more than 650.

Further, in the thermally shrinkable polyester film of the present invention, the thermal shrinking rate in the lengthwise direction upon the treatment for 10 seconds under the unloaded state in hot water of 90° C. as being calculated by the above formula (1) (i.e., the thermal shrinking rate in a lengthwise direction at 90° C.) is 0% to 12%. When the thermal shrinking rate in hot water in the lengthwise direction at 90° C. is less than 0% (i.e., when elongation of more than 2% is resulted by the thermal treatment), no good shrunk appearance can be achieved when used as a label for a bottle and that is not preferred. On the contrary, when the thermal shrinking rate in hot water in the lengthwise direction at 90° C. is more than 12%, strain is apt to be resulted in the shrinkage upon the thermal shrinking when used as a label and that is not preferred. The thermal shrinking rate in hot water in the lengthwise direction at 90° C. is preferably 0.5% to 10%, more preferably 1% to 8%.

In the thermally shrinkable polyester film of the present invention, the difference between the thermal shrinking rate in the widthwise direction of the film calculated by the above formula (1) when treated for 10 seconds under an unloaded state in hot water of 80° C. and the thermal shrinking rate in the widthwise direction of the film calculated by the above formula (1) when treated for 3 seconds under an unloaded state in hot water of 80° C. or, in other words, the difference as being calculated by the following formula (2) is 3% to 15%.

Difference (ΔSHW) (%) in thermal shrinking rate at 80° C.=(Thermal shrinking rate in hot water in widthwise direction at 80° C. for 10 seconds)−(Thermal shrinking rate in hot water in widthwise direction at 80° C. for 3 seconds)    formula (2)

When the difference in the thermal shrinking rate in hot water in the widthwise direction at 80° C. is less than 3%, the thermal shrinking speed in hot water becomes quick whereupon wrinkles, slacks and strains are apt to be resulted in making into a label by subjecting to the thermal shrinking and that is not preferred. On the contrary, the more the difference in the thermal shrinking rates in hot water in the widthwise direction at 80° C., the better although its limit is 15% under the current status. Incidentally, the lower limit of the difference in the thermal shrinking rates in hot water in the widthwise direction at 80° C. is preferred to be not less than 3.5% and more preferred to be not less than 4%.

Further, in the thermally shrinkable polyester film of the present invention, it is necessary that, when the film is shrunk to an extent of 10% in the widthwise direction in hot water of 80° C. and then a right-angle tear strength in the lengthwise direction per unit thickness is determined by the following method, the right-angle tear strength in the lengthwise direction is 180 N/mm to 310 N/mm.

[Method for Measuring the Right-Angle Tear Strength]

Figure 1:
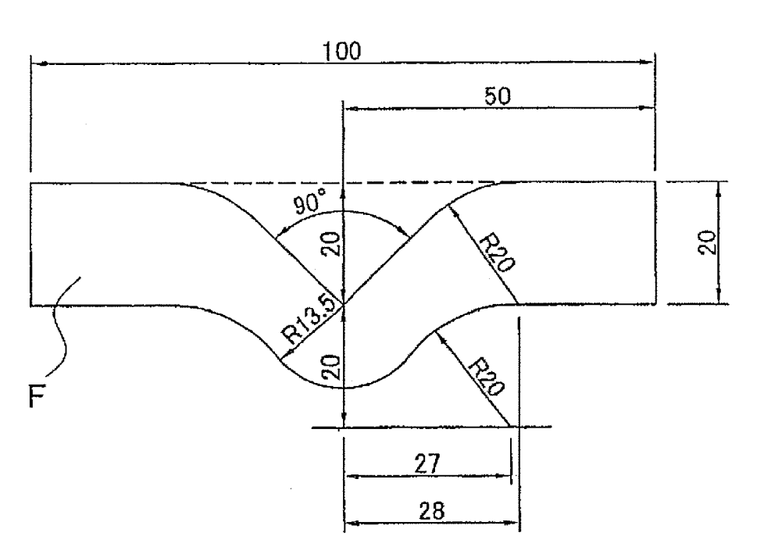
FIG. 1 is an illustrative drawing which shows the shape of a test piece for the measurement of right-angle tear strength. (Incidentally, unit of the length of each part of the test piece in the drawing is mm.)

The film is attached to the rectangular frame having a predetermined length in a state of being previously made loose (or, in other words, both ends of the film are held by the frames). Then the film is shrunk to an extent of 10% in the widthwise direction by means of dipping into hot water of 80° C. for about 5 seconds until the loose film becomes to a tension state (i.e. until the looseness disappears). After that, a test piece is prepared by means of sampling into the shape as shown in FIG. 1 in accordance with JIS K 7128. (Incidentally, in the sampling, the direction of tearing the test piece is defined as the lengthwise direction.) Then both ends of the test piece (widthwise direction) are grasped by an all-purpose tensile tester (Autograph manufactured by Shimadzu), measurement of the strength upon tensile breaking is conducted under the condition where the tensile speed is 200 mm/minute and then the right-angle tear strength per unit thickness is calculated by the following formula (3).

Right-angle tear strength=(Strength upon tensile breaking)/(Thickness)   formula (3)

When the right-angle tear strength after shrinking to an extent of 10% in the widthwise direction in hot water of 80° C. is less than 180 N/mm, there is a possibility of such a case where the breaking easily happens by the shock upon dropping, etc. during the transportation upon use as a label whereby that is not preferred. On the contrary, when the right-angle tear strength is more than 310 N/mm, a cutting property (easy tearing) in the initial stage of tearing the label becomes poor and that is not preferred. Incidentally, the lower limit of the right-angle tear strength is preferred to be not less than 185 N/mm, more preferred to be not less than 190 N/mm, further preferred to be not less than 195 N/mm, and especially preferred to be not less than 200 N/mm. Further, the upper limit of the right-angle tear strength is preferred to be not more than 300 N/mm, more preferred to be not more than 295 N/mm, and especially preferred to be not more than 290 N/mm. It is possible to make the right-angle tear strength lower when hollows are formed in the film by, for example, means of increasing the amount of the additives in the resin.

In the thermally shrinkable polyester film of the present invention, it is preferred that, when it is shrunk to an extent of 10% in the widthwise direction in hot water of 80° C. and then the Elmendorf tear loads in the widthwise and lengthwise directions are measured by the following method, the Elmendorf ratio which is the ratio of the Elmendorf tear loads as such is 0.3 to 1.5.

[Method for Measuring the Elmendorf Ratio]

The film is attached to the rectangular frame having a predetermined length in a state of being previously made loose (or, in other words, both ends of the film are held by the frames). Then the film is shrunk to an extent of 10% in the widthwise direction by means of dipping into hot water of 80° C. for about 5 seconds until the loose film becomes to a tension state (i.e. until the looseness disappears). After that, measurement of the Elmendorf tear load in the widthwise and lengthwise directions of the film is carried out in accordance with JIS K 7128 and the Elmendorf ratio is calculated using the following formula (4).

Elmendorf ratio=(Elmendorf tear load in widthwise direction)/(Elmendorf tear load in lengthwise direction)   formula (4)

When the Elmendorf ratio is less than 0.3, it is difficult to tear straightly along the perforation when used as a label and that is not preferred. On the contrary, when the Elmendorf ratio is more than 1.5, the product is apt to be torn at the position which is other than the perforation and that is not preferred. Incidentally the lower limit of the Elmendorf ratio is preferred to be not less than 0.4, more preferred to be not less than 0.42, and especially preferred to be not less than 0.45, while the upper limit of the Elmendorf ratio is preferred to be not more than 1.4, more preferred to be not more than 1.3, and especially preferred to be not more than 1.2.

It is also necessary that, when the tensile breaking strength in the lengthwise direction of the thermally shrinkable polyester film of the present invention is measured by the following method, it is to be 90 MPa to 300 MPa.

[Method for Measuring the Tensile Breaking Strength]

Test pieces in stripes in a predetermined size are prepared in accordance with JIS K 7113, both ends of the test piece are held by an all-purpose tensile tester, a tensile test is conducted under the condition of 200 mm/minute tensile speed and the strength (stress) upon the tensile breaking in the lengthwise direction of the film is calculated as a tensile breaking strength.

When the tensile breaking strength in the lengthwise direction is lower than 90 MPa, "toughness" (stiffness) upon attaching as a label to a bottle or the like is weak and that is not preferred. On the contrary, when the tensile breaking strength is more than 300 MPa, a cutting property (easy tearing) in the initial stage upon tearing the label becomes poor and that is not preferred. Incidentally, the lower limit of the tensile breaking strength is preferred to be not less than 100 MPa, more preferred to be not less than 110 MPa, and especially preferred to be not less than 120 MPa. The upper limit of the tensile breaking strength is preferred to be not more than 290 MPa, more preferred to be not more than 280 MPa, and especially preferred to be not more than 270 MPa.

In addition, in the thermally shrinkable polyester film of the present invention, it is preferred that the thickness is 10 μm to 70 μm and the haze value is 2.0 to 13.0. When the haze value is more than 13.0, transparency becomes poor and there is a possibility that the appearance in preparing a label becomes bad and that is not preferred. Incidentally, the haze value is preferred to be not more than 11.0 and more preferred to be not more than 9.0. In the meanwhile, the smaller the haze value, the better although the lower limit is about 2.0 when the fact that a predetermined amount of lubricant is inevitably to be added to the film for a purpose of giving a practically necessary sliding property, etc. is taken into consideration.

In the thermally shrinkable polyester film of the present invention, its dynamic friction coefficient (that when the surface and the back of the thermally shrinkable polyester film are made to contact with each other) is preferred to be 0.1 to 0.55. When the dynamic friction coefficient is less than 0.1 or more than 0.55, the processing characteristic in making into a label becomes poor and that is not preferred. The lower limit of the dynamic friction coefficient is more preferred to be not less than 0.15 and especially preferred to be not less than 0.2. The upper limit of the dynamic friction coefficient is more preferred to be not more than 0.53 and especially preferred to be not more than 0.50.

The above-mentioned thermally shrinkable polyester film of the present invention can be prepared in such a manner that the above-mentioned polyester material is subjected to melt extrusion using an extruder and the resulting non-stretched film is subjected to biaxial stretching and thermal treatment according to a predetermined method as shown below.

In subjecting the material resin to a melt extrusion, it is preferred that the polyester material is dried using a drier such as a hopper drier or a paddle drier or using a vacuum drier. After the polyester material is dried as such, it is melted at the temperature of 200 to 300° C. using an extruder and is extruded into film. In conducting such an extrusion, it is possible to adopt any of the known methods such as a T die method or a tubular method.

When the melted resin in a sheet form after the extrusion is quickly cooled, a non-stretched film can be prepared. As to a method for quick cooling of the melted resin, there may adopted a method where the melted resin is cast onto a rotating drum from mouthpieces to quickly solidify whereupon a substantially non-orientated resin sheet is prepared.

The resulting non-stretched film is then stretched in the lengthwise direction under a predetermined condition as mentioned below, the film after the longitudinal stretching is subjected to an annealing treatment, quickly cooled and once subjected to a thermal treatment and the resulting film after the thermal treatment is cooled under a predetermined condition, stretched in a widthwise direction under a predetermined condition and subjected to a thermal treatment once again whereupon the thermally shrinkable polyester film of the present invention can be prepared. As hereunder, a preferred film-preparing method for the production of the thermally shrinkable polyester film of the present invention will be illustrated in detail by taking the difference from the conventional preparing method for the thermally shrinkable polyester film into consideration.

[Method for Preparing the Thermally Shrinkable Polyester Film of the Present Invention]

As mentioned above, the thermally shrinkable polyester film is prepared usually by stretching the non-stretched film only in a direction to be shrunk (thus, in a main stretching direction; usually in a widthwise direction). As a result of the investigation of the present inventors for the conventional manufacturing method, it has been found that the following problems are available in the conventional manufacture of the thermally shrinkable polyester film.

When stretch is applied only in the widthwise direction, the mechanical strength in the lengthwise direction becomes small as mentioned above and the opening ability along the perforation after making into a label becomes poor. In addition, it is difficult to raise a line speed of the film manufacturing device.

When a method of stretching in the lengthwise direction after stretching in a widthwise direction is adopted, it is not possible to sufficiently express the shrinking force in the widthwise direction even if any stretching condition is adopted. Moreover, the shrinking force in the lengthwise direction is expressed at the same time and the finish after the shrinking and the attaching when made into a label becomes poor.

When a method of stretching in a widthwise direction after stretching in a lengthwise direction is adopted, although the shrinking force in a widthwise direction can be expressed, the shrinking force in the lengthwise direction is also expressed at the same time and the finish after the shrinking and the attaching when made into a label becomes poor.

Further, based on the above-mentioned problems in the manufacture of the conventional thermally shrinkable polyester film, the present inventors have further conducted the investigation for preparing a thermally shrinkable polyester film where the opening ability along the perforation is good and the productivity is high whereupon they have achieved the following facts.

In order to make the opening ability along the perforation after making into a label better, it is likely to be necessary that the molecules orientated in the lengthwise direction are to be preserved to some extent.

In order to make the finish after the shrinking and the attaching after making into a label better, it is essential that no shrinking force in a lengthwise direction is to be expressed and, for such a purpose, it is likely to be necessary that the tension state of the molecules orientated in the lengthwise direction is to be released.

In view of the above findings, the present inventors thought it is necessary that "molecules which are orientated in a lengthwise direction but do not contribute in a shrinking force" are to be made to exist in the film for a purpose that both good opening ability along perforation and good finish upon shrinking are satisfied. Then further trials and errors were done for finding how the "molecules which are orientated in a lengthwise direction but do not contribute in a shrinking force" can be made to exist in the film by what kinds of stretching is done. As a result, when the following means is carried out during the manufacture of a film by the so-called longitudinal-lateral stretching method where stretching is done in a widthwise direction after stretching in a lengthwise direction, the "molecules which are orientated in a lengthwise direction but do not contribute in a shrinking force" can be made to exist in the film and it is now possible to prepare a thermally shrinkable polyester film which satisfies both good opening ability along perforation and good finish upon shrinking whereupon the present invention has been achieved.

(1) control of the longitudinal stretching condition;
(2) an annealing treatment in a lengthwise direction after the longitudinal stretching;
(3) an intermediate thermal treatment after the longitudinal stretching;
(4) a natural cooling (interruption of heating) between the intermediate thermal treatment and the lateral stretching;
(5) a compulsory cooling of the film after the natural cooling; and
(6) control of the condition for the lateral stretching.

As hereunder, each of the above-mentioned means will be illustrated.

(1) Control of the Longitudinal Stretching Condition

In the manufacture of the film by the longitudinal-lateral stretching method according to the present invention, it is necessary that the longitudinal stretching is carried out in two stages. Thus, it is necessary that the substantially non-orientated (non-stretched) film is firstly subjected to a longitudinal stretching at the temperature of from Tg to (Tg+30° C.) so as to stretch to an extent of from 2.2-fold to 3.0-fold (the first stretching) and then subjected to a longitudinal stretching at the temperature of from (Tg+10° C.) to (Tg+40° C.) so as to stretch to an extent of from 1.2-fold to 1.5-fold (the second stretching) without cooling down to the temperature of not higher than Tg whereby the longitudinal stretching is carried out so as to make the total longitudinal stretching magnification (i.e., [the first longitudinal stretching magnification]× [the second longitudinal stretching magnification]) from 2.8-fold to 4.5-fold. It is more preferred that the longitudinal stretching is conducted so as to make the total longitudinal stretching magnification from 2.9-fold to 4.3-fold.

When a longitudinal stretching is conducted in two stages as mentioned above, it is preferred that the condition for the longitudinal stretching is adjusted in such a manner that the refractive index of the film in the lengthwise direction after the longitudinal stretching becomes within a range of 1.600 to 1.630 and the thermal shrinking stress in the lengthwise direction of the film after the longitudinal stretching becomes not more than 10 MPa. As a result of conducting the longitudinal stretching under the condition as such, it is now possible to control the orientation degrees in the lengthwise and widthwise directions of the film and the degree of the tension at the time of the intermediate thermal treatment, the lateral stretching and the final thermal treatment which will be mentioned later whereupon it is now also possible to make the opening ability along the perforation of the final film good.

When the total longitudinal stretching magnification becomes high in case the longitudinal stretching is conducted, the shrinking rate in the lengthwise direction tends to become high. However, when the stretching in the longitudinal direction is conducted in two stages as mentioned above, it is now possible to make the stretching stress in the lengthwise direction small and to lowly suppress the shrinking rate in the lengthwise direction. Further, when the total longitudinal stretching magnification becomes high, the stress in the widthwise direction upon the stretching becomes high whereby control of the final shrinking rate in the widthwise direction tends to become difficult. However, when the stretching is conducted in two stages, it is also possible to make the stretching stress in the lateral direction small and the control of the shrinking rate in the lateral direction becomes easy.

Further, when the total longitudinal stretching magnification becomes high, the right-angle tear strength becomes low and the tensile strength in the lengthwise direction becomes high. When the total longitudinal stretching magnification is made near the lateral stretching magnification, it is possible to make the Elmendorf ratio near 1.0 and the opening ability along the perforation upon making into a label is made better. Furthermore, when the stretching in the longitudinal direction is conducted in two stages, the stretching stress in the lateral direction can be lowered and, as a result thereof, it is possible to make the orientation in the lengthwise direction high whereupon the right-angle tear strength becomes far lower and the tensile strength in the lengthwise direction becomes far high. Accordingly, when the stretching in the longitudinal direction is done in two stages and the total longitudinal stretching magnification is made high, it is now possible to prepare a label having a very good opening ability along the perforation.

On the other hand, when the total longitudinal stretching magnification is more than 4.5-fold, the orientation in the lengthwise direction becomes high whereupon the adhering strength of the solvent becomes low but, as a result of controlling the total longitudinal stretching magnification to an extent of not more than 4.5-fold, it is now possible that the orientation in the widthwise direction is suppressed and the adhering strength of the solvent is kept high. Further, when the total longitudinal stretching magnification is more than 4.5-fold, surface layer roughness becomes small whereby the dynamic friction coefficient becomes high but, as a result of controlling the total longitudinal stretching magnification to an extent of not more than 4.5-fold, it is now possible that a decrease in the surface layer roughness is suppressed and the dynamic friction coefficient is kept low.

Further, when the stretching in the longitudinal direction is done in two stages, the stretching stress in the lengthwise direction becomes small whereby the unevenness in thickness in the lengthwise direction and the unevenness in thickness in the widthwise direction tend to become big but, as a result of making the total longitudinal stretching magnification high, it is now possible to make the unevenness in thickness in the lengthwise direction small and accordingly to make the haze low as well. In addition, when the total longitudinal stretching magnification is made high, the stress upon the lateral stretching becomes high whereby the unevenness in thickness in the widthwise direction can also be made small.

Moreover, when the total longitudinal stretching magnification is made high, the orientation in the lengthwise direction can be made high and the slit property in the final winding-up of the film after the biaxial stretching by the roll can be improved.

(2) Annealing Treatment in a Lengthwise Direction after the Longitudinal Stretching As mentioned above, for a purpose that the "molecules which are orientated in a lengthwise direction but do not contribute in a shrinking force" are made to exist in the film, it is preferred that the molecules orientated in the lengthwise direction are subjected to a thermal relax. When the residual shrinking stress in the lengthwise direction of the film after the longitudinal stretching is high, there is a disadvantage that the shrinking rate in hot water in the lengthwise direction of the film after the lateral stretching becomes high whereby the finish of the shrinking become poor. Although it is effective for reducing the shrinking rate in hot water in the lengthwise direction of the film to conduct a thermal treatment in the lateral stretching step, a mere relax by means of heat is not always enough to fully lower the shrinking rate in hot water in the lengthwise direction of the film but high amount of heat is necessary. In view of the above, the present inventors have investigated the means for lowering, before the lateral stretching, the residual shrinking stress in the lengthwise direction of the film after the longitudinal stretching, if at all possible. As a result, it has been found that, when the film after the longitudinal stretching is applied with the relax in the lengthwise direction utilizing the speed difference between the rolls while heating the film after the longitudinal stretching using an infrared heater, a decrease in the residual shrinking stress is more than a decrease in the orientation in the lengthwise direction whereupon the residual shrinking stress decreases to an extent of one half or even more.

The orientation does not decrease only by means of heating by an infrared heater without the means of relax although the decrease in the shrinking stress in the lengthwise direction is still insufficient. When only relax is applied without heating by an infrared heater, the film cannot be sufficiently relaxed between the rolls but is loosened and there is an inconvenience of winding around the roll. The relaxing rate in the lengthwise direction is 10% to 70%. When the relaxing rate is lower than 10%, it is difficult to reduce the shrinking stress in the lengthwise direction of the film after the longitudinal stretching to an extent of one half. When the relaxing rate is more than 70%, although the shrinking stress of the film after the longitudinal stretching decrease to an extent of one half or even more, the orientation in the lengthwise direction also decreases whereby the cutting property in the lengthwise direction becomes poor and the productivity becomes poor as well.

In the heating by the infrared heater upon the annealing treatment, the film temperature is preferred to be from (Tg+ 10° C.) to (Tg+40° C.). When the temperature is lower than (Tg+10° C.), it cannot be said to be sufficiently heated and, upon the relaxing, the film becomes loose resulting in winding around the roll and generation of wrinkles. When heating is done at a temperature higher than (Tg+40° C.), crystallization of the film proceeds and the lateral stretching in the next step becomes difficult. With regard to the means for heating the film in the annealing treatment step, other heating means such as a hot-wind drier than the infrared heater may be used although, in terms of reducing the space of the equipment, the infrared heater is suitable.

It has been also found that, as a result of the annealing treatment, difference in the thermal shrinking rate ($\Delta$SHW) between 10 seconds treatment and 3 seconds treatment for the thermal shrinking rate in hot water of 80° C. in the widthwise direction of the film becomes large. Because the film subjected to the annealing treatment after the longitudinal stretching has small shrinking stress in the lengthwise direction, the stretch stress in the stretching in the widthwise direction of the film becomes small and the residual stress in the widthwise direction of the film after stretching in a widthwise direction of the film becomes small. It is believed that, as a result, difference in the thermal shrinking rate (ΔSHW) in hot water of 80° C. in the widthwise direction of the film becomes large.

(3) Intermediate Thermal Treatment after the Longitudinal Stretching

As mentioned above, it is preferred to subject the molecules orientated in the lengthwise direction to the thermal relax for a purpose that the "molecules which are orientated in a lengthwise direction but do not contribute in a shrinking force" are made to exist in the film. However, it has been the technical common knowledge in the related industry that, when a thermal treatment of high temperature is applied to the film between the stretching in the first axis and that in the second axis during the biaxial stretch of the film, the film after the thermal treatment is crystallized whereby no more stretching is possible. According to the result of the trials and errors of the present inventors however, there has been found the following surprising fact. Thus, when a longitudinal stretching is done under a predetermined condition, an intermediate thermal treatment is done under a predetermined condition depending upon the state of the film after the longitudinal stretching and a lateral stretching is done under a predetermined condition depending upon the state of the film after the intermediate thermal treatment in a longitudinal-lateral stretching method, it is now possible that the "molecules which are orientated in a lengthwise direction but do not contribute in a shrinking force" can be made to exist in the film without causing the breakage during the lateral stretching.

Thus, in the manufacture of the film according to the longitudinal-lateral stretching method of the present invention, it is necessary to conduct the thermal treatment (hereinafter, it will be referred to as an intermediate thermal treatment) during the time of 1.0 second to 9.0 seconds at the temperature of 130° C. to 190° C. under such a state that both ends of the film in the widthwise direction are held by clips in a tenter, after the non-stretched film is subjected to a longitudinal stretching and an annealing treatment. As a result of conducting the intermediate thermal treatment as such, it is now possible that the "molecules which are orientated in a lengthwise direction but do not contribute in a shrinking force" are made to exist in the film whereupon it is now also possible to prepare a film where an opening ability along the perforation after making into a label is good and no unevenness in the shrinking is resulted. Incidentally, it is not always possible that the "molecules which are orientated in a lengthwise direction but do not contribute in a shrinking force" are made to exist in the film by any longitudinal stretching but it is for the first time possible now that the "molecules which are orientated in a lengthwise direction but do not contribute in a shrinking force" are made to exist in the film after the intermediate thermal treatment provided that the above-mentioned predetermined longitudinal stretching is carried out. Then, when the predetermined natural cooling, compulsory cooling and lateral stretching which will be mentioned later are conducted, it is possible to orientate the molecules in the widthwise direction so as to express the shrinking force in the widthwise direction while the state where the "molecules which are orientated in a lengthwise direction but do not contribute in a shrinking force" being formed in the film are still maintained.

Incidentally, the lower limit of the temperature for the intermediate thermal treatment is preferred to be not lower than 133° C. and more preferred to be not lower than 135° C. The upper limit of the temperature for the intermediate thermal treatment is preferred to be not higher than 180° C. and more preferred to be not higher than 170° C. On the other hand, it is necessary that the time for the intermediate thermal treatment is appropriately adjusted to a range of 1.0 second to 9.0 seconds depending upon the composition of the materials and it is preferred to adjust to a range of 3.0 seconds to 7.0 seconds.

When the intermediate thermal treatment as above is carried out, it is preferred that the conditions for the intermediate thermal treatment is adjusted so as to make the refractive index in the lengthwise direction of the film after the intermediate thermal treatment within a range of 1.58 to 1.61 and to make the thermally shrinking stress in the lengthwise direction of the film after the intermediate thermal treatment not more than 0.5 MPa. Further, it is preferred that the conditions for the intermediate thermal treatment is adjusted so as to make the tensile breakage elongation in the lengthwise direction of the film after the intermediate thermal treatment from 100% to 170%. As a result of conducting the intermediate thermal treatment under the predetermined conditions as such, it is possible to control the orientation degrees in the lengthwise and widthwise directions of the film and the degree of the tension of molecules at the time of the lateral stretching and the final thermal treatment whereby it is also possible to make the opening ability along the perforation of the final film good. When the tensile breakage elongation in the lengthwise direction of the film after the intermediate thermal treatment is lower than 100%, the lateral stretching property is poor because the film is fragile and, during the lateral stretching, breakage is apt to happen. On the contrary, when the tensile breakage elongation in the lengthwise direction of the film after the intermediate thermal treatment is higher than 170%, it is difficult to prepare a film having a good opening ability along the perforation even if the conditions for the lateral stretching and the final thermal treatment are adjusted.

Further, when the intermediate thermal treatment is conducted as above, it is preferred to adjust the conditions for the intermediate thermal treatment so as to make the right-angle tear strength in the lengthwise direction of the film after the intermediate thermal treatment not more than 310 N/mm. As a result of applying the intermediate thermal treatment under the predetermined condition as such, it is possible to suppress the quick increase in the right-angle tear strength in the lengthwise direction during the lateral stretching and it is possible to make the opening ability along the perforation of the final film good.

When the treating temperature is kept at not lower than 130° C. in conducting the intermediate thermal treatment as above, it is possible to reduce the stress for shrinking in the lengthwise direction and it is possible to make the shrinking rate in the lengthwise direction very low. Further, when the temperature for the intermediate thermal treatment is controlled to not higher than 190° C., it is possible to reduce the variation in the shrinking rate in the lateral direction.

Further, as a result of keeping the treating temperature at not lower than 130° C., it is possible to make the orientation in the lengthwise direction high and it is possible to keep the right-angle tear strength low and, at the same time, the Elmendorf ratio in the lengthwise direction can be made near 1.0. Furthermore, as a result of controlling the temperature for the intermediate thermal treatment to an extent of not higher than 190° C., it is possible to suppress the crystallization of the film and to keep the tensile strength in the lengthwise direction high.

Still further, as a result of controlling the temperature for the intermediate thermal treatment to not higher than 190° C., it is possible to suppress the crystallization of the surface layer of the film and to keep the adhering strength of the solvent high. In addition, as a result of keeping the treating temperature at not lower than 130° C., the surface roughness of the surface layer is made appropriately high whereby it is possible to make the friction coefficient low.

Furthermore, as a result of controlling the temperature for the intermediate thermal treatment to not higher than 190° C., it is possible to keep the unevenness in thickness in the lengthwise direction small. In addition, as a result of controlling the temperature for the intermediate thermal treatment at not higher than 190° C., it is possible that crystallization of the film is suppressed and that the unevenness in thickness in the widthwise direction caused by variation of the stress during the lateral stretching is kept small.

Further, as a result of controlling the temperature for the intermediate thermal treatment at not higher than 190° C., it is possible to suppress the breakage of the film caused by generation of uneven shrinking of the film, and to keep the good slit property. In addition, as a result of controlling the temperature for the intermediate thermal treatment at not higher than 190° C., it is possible that the haze of the film which becomes high due to crystallization of the film is suppressed to be low.

(4) Natural Cooling (Interruption of Heating) Between the Intermediate Thermal Treatment and the Lateral Stretching In the manufacture of the film according to the longitudinal-lateral stretching method of the present invention, it is necessary to apply the intermediate thermal treatment after the longitudinal stretching as mentioned above and, after the longitudinal stretching and the intermediate thermal treatment, it is necessary to pass through an intermediate zone where no positive heating operation is conducted preferably during the time of 0.5 second to 3.0 seconds. Thus, it is preferred that an intermediate zone is formed before the lateral stretching zone of the tenter for the lateral stretching, the film after that longitudinal stretching is introduced to the tenter and passed through the intermediate zone during the predetermined time and, after that, the lateral stretching is carried out. In addition, it is preferred that, in the intermediate zone, the accompanying flow as a result of the flow of the film and hot wind from the cooling zone are shut out so that, when the paper pieces in stripes are hung down in such a state where no film is passed, the paper pieces are hung down in an almost completely vertical direction. Incidentally, when the time for passing through the intermediate zone is shorter than 0.5 second, the lateral stretching becomes a stretching at high temperature and the shrinking rate in the lateral direction cannot be made sufficiently high and that is not preferred. On the contrary, the time for passing through the intermediate zone is sufficient enough if it is 3.0 seconds and, even if longer time than that is set, it is useless for the installation and that is not preferred. In the meanwhile, the lower limit of the time for passing through the intermediate zone is preferred to be not shorter than 0.7 second and more preferred to be not shorter than 0.9 second while the upper limit of the time for passing through the intermediate zone is preferred to be not longer than 2.8 seconds and more preferred to be not longer than 2.6 seconds.

(5) Compulsory Cooling of the Film after the Natural Cooling

In the manufacture of the film by the longitudinal-lateral stretching method of the present invention, it is necessary to positively conduct a compulsory cooling so as to make the temperature of the film at 80° C. to 120° C. as mentioned above instead of that the naturally cooled film is just subjected to a lateral stretching. As a result of carrying out the compulsory cooling treatment as such, it is possible to give a film where the opening ability along the perforation after making into a label is good. Incidentally, the lower limit of the temperature of the film after the compulsory cooling is preferred to be not lower than 85° C. and more preferred to be not lower than 90° C. while the upper limit of the temperature of the film after the compulsory cooling is preferred to be not higher than 115° C. and more preferred to be not higher than 110° C.

In subjecting the film to a compulsory cooling as mentioned above, the shrinking rate of the film in the widthwise direction becomes low and the shrinking property upon making into a label becomes insufficient if the temperature of the film after the compulsory cooling is still higher than 120° C. As result of the control so as to make the film temperature after the cooling to an extent of not higher than 120° C., it is now possible to keep the shrinking rate of the film in the widthwise direction high.

If the film temperature after the compulsory cooling is still higher than 120° C. in conducting the compulsory cooling, there is a tendency that the film is crystallized, the haze becomes high, the tensile strength in the lengthwise direction lowers and the adhering strength of the solvent lowers but, as a result of conducting a compulsory cooling so as to make the temperature after the cooling not higher than 120° C., it is now possible that the haze is kept low and the tensile strength in the lengthwise direction and the adhering strength of the solvent are kept high.

Further, when the film temperature after the compulsory cooling is still higher than 120° C. in conducting the compulsory cooling of the film, the stress of the lateral stretching to be done after the cooling becomes small and the unevenness in thickness in the widthwise direction tends to become large. However, when a compulsory cooling is done so as to make the film temperature after the cooling not higher than 120° C., it is possible to raise the stress of the lateral stretching to be done after the cooling and to make the unevenness in thickness in the widthwise direction small.

In addition, when the film temperature after the compulsory cooling is higher than 120° C. in conducting the compulsory cooling of the film, the film is crystallized whereupon the breakage of the film is apt to happen. However, when a compulsory cooling is done so as to make the film temperature after the cooling not higher than 120° C., it is possible to suppress the breakage of the film.

(6) Control of the Condition for the Lateral Stretching

In the manufacture of the film by a longitudinal-lateral stretching method according to the present invention, it is necessary that the film after longitudinal stretching, annealing, intermediate thermal treatment, natural cooling and compulsory cooling is subjected to a lateral stretching and a final thermal treatment under a predetermined condition. Thus, it is necessary that the lateral stretching is to be done in such a manner that, under the state where both ends in the widthwise direction are held by clips in a tenter, magnification of 2.0-fold to 6.0-fold is to be achieved at the temperature of (Tg+10° C.) to (Tg+40° C.) or, for example, at the temperature of 80° C. to 120° C. As a result of applying the lateral stretching under the predetermined condition as such, it is possible to express the shrinking force in the widthwise direction by orientating the molecules in the widthwise direction while the "molecules which are orientated in a lengthwise direction but do not contribute in a shrinking force" being formed by the longitudinal stretching and the intermediate thermal treatment are still held, and it is possible to prepare the film where the opening ability along the perforation when made into a label is good. Incidentally, the lower limit of the temperature for the lateral stretching is preferably not lower than 85° C. and, more preferably, it is not lower than 90° C. while the upper limit of the temperature for the lateral stretching is preferably not higher than 115° C. and, more preferably, it is not higher than 110° C. On the other hand, the lower limit of the magnification of the lateral stretching is preferred to be not less than 2.5-fold and more preferred to be not less than 3.0-fold while the upper limit of the magnification of the lateral stretching is preferred to be not more than 5.5-fold and more preferred to be not more than 5.0-fold.

When the stretching temperature is made high in conducting the lateral stretching as mentioned above, the tensile strength in the lengthwise direction becomes high, the Elmendorf ratio in the lengthwise direction becomes near 1.0, the right-angle tear strength becomes low and the opening ability along the perforation after making into a label becomes good.

Further, when the stretching temperature is higher than 120° C., the shrinking rate in the lengthwise direction becomes high and, at the same time, the shrinking rate in the widthwise direction becomes low but, as a result of controlling the stretching temperature to an extent of not higher than 120° C., it is possible to suppress the shrinking rate in the lengthwise direction to the low degree and, at the same time, to highly keep the shrinking rate in the widthwise direction.

Still further, when the stretching temperature in the lateral direction becomes high, the orientation in the lateral direction becomes low and the adhering strength of the solvent becomes high and, at the same time, it is possible to prevent the breakage of the lubricant and it is possible to keep the friction coefficient low. In addition, when the stretching temperature in the lateral stretching becomes high, the voids inside the film decrease whereupon the haze of the film lowers.

Furthermore, when the stretching temperature becomes higher than 120° C., the unevenness in thickness in the widthwise direction is apt to become big but, when the stretching temperature is controlled to an extent of not higher than 120° C., the unevenness in thickness in the widthwise direction can be made small.

On the contrary, when the stretching temperature becomes lower than 80° C., the orientation in the widthwise direction becomes too high whereupon breakage upon the lateral stretching is apt to happen and the slit property in the final winding of the film on the roll after the biaxial stretching becomes poor. However, as a result of controlling the stretching temperature to an extent of not lower than 80° C., it is now possible to reduce the breakage in the lateral stretching and to improve the slit property upon winding.

It is necessary that the film after the lateral stretching is subjected to a final thermal treatment during the time of 1.0 second to 9.0 seconds at the temperature of 80° C. to 130° C. under such a state that both ends in the widthwise direction are held by clips in a tenter. When the temperature is higher than 130° C., the shrinking rate in the widthwise direction lowers and the thermal shrinking rate at 90° C. becomes lower than 40% and that is not preferred. On the contrary, when it is lower than 80° C., no sufficient relax in the widthwise direction is possible and, when the final product is stored at ambient temperature, the shrinking in the widthwise direction with elapse of time (the so-called natural shrinking rate) becomes big and that is not preferred. Further, the longer the thermal treating time, the better but, if it is too long, the facilities become too big whereby the time of shorter than 9.0 seconds is preferred.

[Influence of the Interaction in the Manufacturing Steps on the Film Characteristics]

In the manufacture of the thermally shrinkable polyester film of the present invention, just a sole use of any of longitudinal stretching step, intermediate thermal treatment step, natural cooling step, compulsory cooling step and lateral stretching step cannot make the characteristics of the film good but, when all of those longitudinal stretching step, intermediate thermal treatment step, natural cooling step, compulsory cooling step and lateral stretching step are carried out under predetermined conditions, it is now possible that the film characteristics are made good very efficiently. Among the characteristics of the film, values of the important ones such as Elmendorf ratio, right-angle tear strength in lengthwise direction, tensile breaking strength in lengthwise direction, unevenness in thickness in widthwise direction, dynamic friction coefficient and unevenness in thickness in lengthwise direction greatly vary depending upon the interaction of the specific plural steps.

Thus, in the thermally shrinkable polyester film of the present invention, it is necessary to adjust the right-angle tear strength in the lengthwise direction to the range of from 180 N/mm to 310 N/mm and, preferably, the right-angle tear strength in the lengthwise direction is adjusted to the range of from 190 N/mm to 300 N/mm, more preferably from 200 N/mm to 290 N/mm while Elmendorf ratio is adjusted to the range of from 0.3 to 1.5. The interaction of the longitudinal stretching step and the intermediate thermal treatment step very greatly affects the Elmendorf ratio and the right-angle tear strength in the lengthwise direction. Further, when voids are formed by increasing the adding amount of an additive in the resin as mentioned above, the right-angle tear strength in the lengthwise direction can be adjusted to be small.

Further, in the thermally shrinkable polyester film of the present invention, it is necessary to adjust the tensile breaking strength in the lengthwise direction to the range of from 90 MPa to 300 MPa. The interaction of the three steps (longitudinal stretching step, intermediate thermal treatment step and lateral stretching step) very greatly affects the tensile breaking strength in the lengthwise direction.

Furthermore, in the thermally shrinkable polyester film of the present invention, it is preferred to adjust the unevenness in thickness in the widthwise direction to the range of from 1.0% to 10.0%. The interaction of the three steps (longitudinal stretching step, intermediate thermal treatment step and lateral stretching step) very greatly affects the unevenness in thickness in the widthwise direction.

In addition, in the thermally shrinkable polyester film of the present invention, it is preferred to adjust the dynamic friction coefficient to the range of from 0.1 to 0.55. The interaction of the longitudinal stretching step and the intermediate thermal treatment step greatly affects the dynamic friction coefficient.

Moreover, in the thermally shrinkable polyester film of the present invention, it is preferred to adjust the unevenness in thickness in the lengthwise direction to the range of from 1.0% to 12.0%. The interaction of the longitudinal stretching step and the intermediate thermal treatment step greatly affects the unevenness in thickness in the lengthwise direction.

Accordingly, for such a purpose that Elmendorf ratio, right-angle tear strength in the lengthwise direction, tear breaking strength, unevenness in thickness in the widthwise direction, dynamic friction coefficient and unevenness in thickness in the lengthwise direction of the thermally shrinkable polyester film are adjusted to the ranges of the present invention, it is necessary to delicately adjust the conditions as mentioned in the above (1) to (6) taking the above-mentioned interactions among the steps into consideration.

The packed product of the present invention is formed in such a manner that the above-mentioned thermally shrinkable polyester film is used as a base material and a label where perforation or a pair of notches is formed on the base material is coated at least on a part of the outer surface of the thing to be packed followed by subjecting to a thermal shrinking. Examples of the thing to be packed include PET bottles for beverages; various kinds of bottles and cans; plastic containers for confectionery, lunch box, etc.; and boxes made of paper. It is common that, when the thing to be packed is coated by means of thermal shrinking of the label where the thermally shrinkable polyester film is used as a base material, the label is subjected to thermal shrinking to an extent of about 2 to 15% and closely adhered to the thing to be packed. Incidentally, the label for coating the thing to be packed may be either printed or unprinted.

With regard to a method for preparing a label, there are a method where an organic solvent is applied to the area which is a bit inside from the end of one side of a rectangular film, the film is then immediately made round and the ends thereof are layered and adhered to make into a label and a method where an organic solvent is applied to the area which is a bit inside from the end of one side of a wound film in a roll shape, the film is then immediately made round and the ends thereof are layered and adhered and the resulting tube-shaped one is cut into a label. As to the organic solvent for the adhesion, it is preferred to use a cyclic ether such as 1,3-dioxorane or tetrahydrofuran. Besides the above, it is also possible to use an aromatic hydrocarbon such as benzene, toluene, xylene or trimethylbenzene; a halogenated hydrocarbon such as methylene chloride or chloroform; a phenol compound such as phenol; and a mixture thereof.

EXAMPLES

The present invention will now be more specifically illustrated by way of Examples and Comparative Examples although the present invention is never limited to the embodiments of such Examples but may be appropriately modified within a scope of the gist of the present invention. Incidentally, a method for the evaluation of the film is shown below.

[Thermal Shrinking Rate (Thermal Shrinking Rate in Hot Water)]

Film was cut into squares each being in a size of 10 cm×10 cm and subjected to a thermal shrinking by treating for seconds under an unloaded state in hot water of (predetermined temperature)±0.5° C., sizes of the film in longitudinal and lateral directions were measured and the thermal shrinking rate was determined according to the following formula (1). The direction where the thermal shrinking rate is higher was defined as the main shrinking direction.

Thermal shrinking rate (%)={[(Length before shrinking)−(Length after shrinking)]/[Length before shrinking]}×100     formula (1)

[Difference in Thermal Shrinking Rate at 80° C. (Difference in Thermal Shrinking Rate in Hot Water)]

The above was determined by the following formula (2) from the value upon the treatment for 3 seconds and from the value upon the treatment for 10 seconds under an unloaded state in hot water, in the thermal shrinking rate at 80° C. in the widthwise direction of the film calculated by the above formula (1).

Difference ($\Delta SHW$) (%) in thermal shrinking rate at 80° C.=(Thermal shrinking rate in hot water in widthwise direction at 80° C. for 10 seconds)−(Thermal shrinking rate in hot water in widthwise direction at 80° C. for 3 seconds)     formula (2)

[Right-Angle Tear Strength]

The film is attached to the rectangular frame having a predetermined length in a state of being previously made loose (or, in other words, both ends of the film are held by the frames). Then the film is shrunk to an extent of 10% in the widthwise direction by means of dipping into hot water of 80° C. for about 5 seconds until the loose film becomes to a tension state (i.e. until the looseness disappears). After that, a test piece is prepared by means of sampling into the shape as shown in FIG. 1 in accordance with JIS K 7128. (Incidentally, in the sampling, the direction of tearing the test piece is defined as the lengthwise direction.) Then both ends of the test piece (widthwise direction) are grasped by an all-purpose tensile tester (Autograph manufactured by Shimadzu), measurement of the strength upon tensile breaking is conducted under the condition where the tensile speed is 200 mm/minute and then the right-angle tear strength per unit thickness is calculated by the following formula (3).

Right-angle tear strength=(Strength upon tensile breaking)/(Thickness)     formula (3)

[Elmendorf Ratio]

The film is attached to the rectangular frame having a predetermined length in a state of being previously made loose (or, in other words, both ends of the film are held by the frames). Then the film is shrunk to an extent of 10% in the widthwise direction by means of dipping into hot water of 80° C. for about 5 seconds until the loose film becomes to a tension state (i.e. until the looseness disappears). After that, measurement of the Elmendorf tear load in the widthwise and lengthwise directions of the film is carried out in accordance with JIS K 7128 and the Elmendorf ratio is calculated using the following formula (4).

Elmendorf ratio=(Elmendorf tear load in widthwise direction)/(Elmendorf tear load in lengthwise direction)     formula (4)

[Tg (Glass Transition Point)]

A differential scanning calorimeter (type: DSC220; manufactured by Seiko Electronic Industry) was used and the glass transition point was determined from the resulting endothermic curve by raising the temperature of the non-stretched film (5 mg) from −40° C. to 120° C. at a raising speed of 10° C. per minute. Tangents were drawn before and after the inflection point of the endothermic curve and their crossing point was adopted as Tg (glass transition point).

[Refractive Index]

"Abbe's refractometer; type 4T" manufactured by Atago was used and the measurement was conducted after being allowed each sample film to stand for not shorter than 2 hours in an atmosphere of 23° C. and 65% RH.

[Unevenness in Thickness in Widthwise Direction]

The film was subjected to a sampling into broad stripes (40 mm length×1.2 m width) and the thickness was continuously measured along the widthwise direction of the sample film at the rate of 5 m/minute using a thickness meter of a continuously contacting type (manufactured by Micron Sokuteiki KK) (length for the measurement was 500 mm). The unevenness in thickness of the film in a widthwise direction was calculated by the following formula (5) where Tmax is the maximum thickness and Tmin is the minimum thickness upon the measurement while Tave is an average thickness.

$$\text{Unevenness in thickness (\%)} = \{(T_{max} - T_{min})/T_{ave}\} \times 100 \quad \text{formula (5)}$$

[Unevenness in Thickness in Lengthwise Direction]

The film was subjected to a sampling into long rolls (12 m length×40 mm width) and the thickness was continuously measured along the lengthwise direction of the sample film at the rate of 5 m/minute using a thickness meter of a continuously contacting type (manufactured by Micron Sokuteiki KK) (length for the measurement was 10 m). The unevenness in thickness of the film in a lengthwise direction was calculated by the above formula (5) where Tmax is the maximum thickness and Tmin is the minimum thickness upon the measurement while Tave is an average thickness.

[Strain by Shrinkage in Label]

Both ends of the thermally shrinkable film were adhered using dioxorane to prepare a cylindrical label (a label where the main shrinking direction of the thermally shrinkable film was a circumferential direction). After that, it was subjected to a thermal shrinking to a 500-ml PET bottle (diameter of the trunk of the bottle: 62 mm; minimum diameter of the neck of the bottle: 25 mm) with the passing time of 2.5 seconds and at the zone temperature of 80° C. using a steam tunnel (type: SH-1500-L; manufactured by Fuji Astec Inc.) whereupon a label was attached. In the attachment, such an adjustment was done that, on the neck, an area of 40 mm diameter contacted one of the ends of the label. As an evaluation of the finish after shrinking, the strain in a 360° direction of the upper area of the attached label was measured using a gage and the maximum value of the strain was determined. At that time, evaluation was done according to the following standards.

oo: maximum strain was less than 1.5 mm
o: maximum strain was not less than 1.5 mm and less than 2.5 mm
x: maximum strain was not less than 2.5 mm

[Close Adhesion Property of the Label]

A label was attached under the same condition as the measuring condition for the above shrinking finish. The evaluation was conducted in such a manner that, when the attached label and the PET bottle were gently screwed, the case where the label did not move was marked "o" while the case where the label slipped therethrough or the label and the bottle were shifted was marked "x".

[Opening Ability Along the Perforation]

A label where a perforation was previously formed in the direction crossing at right angles to the main shrinking direction was attached to a PET bottle under the same condition as for the above measuring condition for the shrinking finish with a proviso that the perforation was formed by applying the pores of 1 mm length with 1 mm intervals and two perforation lines were formed in a longitudinal direction (in a height direction) of the label with 22 mm width and 120 mm length. After that, 500 ml of water was charged in this bottle and cooled at 5° C., the perforation of the label of the bottle immediately after being taken out from the refrigerator was torn by fingers. Numbers of the bottle whose label was well torn along the perforation in the longitudinal direction whereby the label could be removed from the bottle were counted and said numbers were deducted from the total sample numbers (50) to calculate the rejected rate (%) in the opening ability along the perforation.

As hereunder, the compositions of the polyester material used in Examples and Comparative Examples and the resin composition and manufacturing condition (such as the conditions for stretching and thermal treatment) of the film in Examples and Comparative Examples are shown in Tables 1 and 2, respectively.

TABLE 1

| | Composition of polyester material (molar %) | | | | | |
|---|---|---|---|---|---|---|
| | Dicarboxylic acid component | Polyhydroxil alcohol component | | | | Lubricant adding amount |
| | DMT | EG | NPG | CHDM | BD | (ppm) |
| Polyester A | 100 | 100 | — | — | — | 8000 |
| Polyester A2 | 100 | 100 | — | — | — | 0 |
| Polyester B | 100 | 70 | 30 | — | — | 0 |
| Polyester C | 100 | 70 | — | 30 | — | 0 |
| Polyester D | 100 | — | — | — | 100 | 0 |

TABLE 2

| | | Monomer amount of non-crystalline component (molar %) | Stretching condition Longitudinal stretching | | | | |
|---|---|---|---|---|---|---|---|
| | | | First stretching stage | | Second stretching stage | | |
| | Resin composition | | Temperature (° C.) | Magnification | Temperature (° C.) | Magnification | Total magnification |
| Example 1 | A/A2/B/D = 5:5:80:10 | 24 | 78 | 2.6 | 95 | 1.4 | 3.64 |
| Example 2 | A/A2/C/D = 5:5:80:10 | 24 | 78 | 2.6 | 95 | 1.4 | 3.64 |
| Example 3 | A/A2/B/D = 5:5:80:10 | 24 | 78 | 2.6 | 95 | 1.4 | 3.64 |
| Example 4 | A/A2/B/D = 5:30:55:10 | 16.5 | 80 | 2.3 | 98 | 1.3 | 2.99 |
| Example 5 | A/A2/B/D = 5:5:80:10 | 24 | 78 | 2.6 | 95 | 1.4 | 3.64 |
| Example 6 | A/A2/B/D = 5:5:80:10 | 24 | 78 | 2.6 | 95 | 1.4 | 3.64 |
| Example 7 | A/A2/B/D = 5:5:80:10 | 24 | 78 | 3 | 95 | 1.4 | 4.2 |
| Example 8 | A/A2/B/D = 5:5:80:10 | 24 | 78 | 3 | 95 | 1.4 | 4.2 |
| Comparative Example 1 | A/A2/B/D = 5:5:80:10 | 24 | 78 | 2.6 | 95 | 1.4 | 3.64 |
| Comparative Example 2 | A/A2/B/D = 5:5:80:10 | 24 | No longitudinal stretching | | | | |

TABLE 2-continued

| | | | | | | | |
|---|---|---|---|---|---|---|---|
| Comparative Example 3 | A/A2/B/D = 5:5:80:10 | 24 | 78 | 2.6 | 95 | 1.4 | 3.64 |
| Comparative Example 4 | A/A2/B/D = 5:5:80:10 | 24 | 78 | 2.6 | 95 | 1.4 | 3.64 |

| | Stretching condition | | | | | | | |
|---|---|---|---|---|---|---|---|---|
| | Annealing treatment | | Intermediate thermal treatment (after longitudinal stretching) | | | | Lateral stretching step | | |
| | Film temperature | Relaxing rate (%) | Temperature (° C.) | Period (second) | Presence or absence of intermediate zone | Temperature of cooling step (° C.) | Temperature (° C.) | Magnification | Temperature of final heat-treatment (° C.) |
| Example 1 | 93 | 30 | 140 | 5 | Present | 100 | 95 | 4 | 85 |
| Example 2 | 93 | 30 | 140 | 5 | Present | 100 | 95 | 4 | 85 |
| Example 3 | 93 | 40 | 140 | 5 | Present | 100 | 95 | 4 | 85 |
| Example 4 | 93 | 30 | 145 | 5 | Present | 100 | 100 | 4 | 85 |
| Example 5 | 100 | 20 | 140 | 5 | Present | 100 | 95 | 4 | 85 |
| Example 6 | 93 | 50 | 140 | 5 | Present | 100 | 95 | 4 | 85 |
| Example 7 | 93 | 50 | 145 | 5 | Present | 100 | 95 | 4 | 85 |
| Example 8 | 93 | 40 | 145 | 5 | Present | 100 | 95 | 4 | 85 |
| Comparative Example 1 | None | | 160 | 5 | Present | 100 | 95 | 4 | 85 |
| Comparative Example 2 | No longitudinal stretching | | No intermediate heat-treatment | | | | 75 | 4 | 85 |
| Comparative Example 3 | 93 | 5 | 140 | 5 | Present | 100 | 95 | 4 | 85 |
| Comparative Example 4 | 93 | 30 | No intermediate heat-treatment | | | | 80 | 4 | 80 |

<Preparation of the Polyester Material>

Into an autoclave made of stainless steel equipped with stirrer, thermometer and partially refluxing condenser were charged 100 molar % of dimethyl terephthalate (DMT) as a dibasic acid component and 100 molar % of ethylene glycol (EG) as a glycol component so as to make the molar ratio of the glycol to the methyl ester 2.2-fold and then an ester interchange reaction was carried out by distilling off the resulting methanol to the outside of the system using 0.05 molar % (to the acid component) of zinc acetate as an ester interchange catalyst. After that, 0.025 molar % (to the acid component) of antimony trioxide was added thereto as a polycondensation catalyst and polycondensation reaction was conducted at 280° C. under a condition of reduced pressure of 26.6 Pa (0.2 Torr) to give a polyester (A) where the intrinsic viscosity was 0.70 dl/g. This polyester was polyethylene terephthalate. Incidentally, in the manufacture of the above polyester (A), 8,000 ppm (to the polyester) of $SiO_2$ (Sicilia 266 manufactured by Fuji Sicia) was added as a lubricant. Further, the polyesters (A2, B, C, D) as shown in Table 1 were synthesized by the same process as above. In the Table, NPG is neopentyl glycol, CHDM is 1,4-cyclohexanedimethanol and BD is 1,4-butanediol. The intrinsic viscosities of the polyesters A2, B, C and D were 0.70 dl/g, 0.72 dl/g, 0.80 dl/g and 1.15 dl/g, respectively. Each of the polyesters was appropriately made into chips.

Example 1

The above-mentioned polyester A, polyester A2, polyester B and polyester D were mixed in a ratio of 5:5:80:10 by weight and poured into an extruder. After that, the mixed resin was melted at 280° C., extruded from a T die and wound around a rotating metal roll where the surface temperature was cooled down to 30° C. so as to quickly cool whereupon a non-stretched film in the thickness of 204 μm was prepared. The pulling out speed (rotating speed of the metal roll) of the non-stretched film at that time was about 20 m/min. Tg of the non-stretched film was 67° C.

The non-stretched film prepared as above was introduced into a longitudinal stretching machine where plural roll groups were continuously arranged and stretched in two stages in a longitudinal direction utilizing the difference in the rotating speeds of the rolls. Thus, after the non-stretched film was subjected to a preliminary heating on a pre-heating roll until the film temperature reached 78° C., it was stretched to an extent of 2.6-fold utilizing the difference in the rotating speeds between a low-speed rotating roll where the surface temperature was set at 78° C. and a medium-speed rotating roll where the surface temperature was set at 78° C. (the first longitudinal stretching stage). After that, the longitudinally stretched film was subjected to a further longitudinal stretching to an extent of 1.4-fold utilizing the difference in the rotating speeds between a medium-speed rotating roll where the surface temperature was set at 95° C. and a high-speed rotating roll where the surface temperature was set at 30° C. (the second longitudinal stretching stage). (Accordingly, the total longitudinal stretching magnification was 3.64-fold.)

The film immediately after the above-mentioned longitudinal stretching was subjected to an annealing treatment by relaxing in the lengthwise direction to an extent of 30% utilizing the speed difference between the rolls together with heating the film to a temperature of 93° C. by an infrared heater.

The film after the above-mentioned annealing treatment was compulsorily cooled at the cooling speed of 40° C. per second using a cooling roll (a high-speed roll positioned immediately after the longitudinal stretching roll in the second stage) where the surface temperature was set at 30° C. and the film after the cooling was introduced into a tenter and continuously passed through intermediate heat-treating zone, first intermediate zone (naturally cooling zone), cooling zone (compulsorily cooling zone), second intermediate zone, lateral stretching zone and final heat-treatment zone. In the tenter, length of the first intermediate zone was set at about 40 cm and a shielding plate was installed in each of the areas between the intermediate heat-treating zone and the first intermediate zone, between the first intermediate zone and the cooling zone, between the cooling zone and the second intermediate zone and between the second intermediate zone and the lateral stretching zone. Further, in the first intermediate zone and the second intermediate zone, hot wind from the intermediate heat-treating zone, cooling wind from the cooling zone and hot wind from the lateral stretching zone were shut out so that, when the paper pieces in stripes were hung down in such a state where no film was passed, the paper pieces were hung down in an almost completely vertical direction. In addition, the distance between the film and the shielding plate was adjusted in such a manner that, during the stage when the film passed, most of the accompanying flow as a result of the flow of the film is shut out by a shielding plate located between the intermediate heat-treating zone and the first intermediate zone. Moreover, the distance between the film and the shielding plate was adjusted in such a manner that, during the stage when the film passed, most of the accompanying flow as a result of the flow of the film is shut out by the shielding plate at the boundary between the intermediate heat-treating zone and the first intermediate zone and between the cooling zone and the second intermediate zone.

Then, the film introduced into a tenter after the annealing was firstly subjected to a thermal treatment for 5.0 seconds at the temperature of 140° C. in the intermediate heat-treating zone and the film after the intermediate thermal treatment was introduced into the first intermediate zone and passed through said zone (passing time: about 1.0 second) to subject to a natural cooling. After that, the film after the natural cooling was introduced into a cooling zone, low-temperature wind was blown thereto until the surface temperature of the film reached 100° C. to positively conduct a compulsory cooling and the film after the cooling was introduced into the second intermediate zone and passed through said zone (passing time: about 1.0 second) to subject to the natural cooling once again. Further, the film after passing through the second intermediate zone was introduced into a lateral stretching zone, subjected to a preliminary heating until the surface temperature of the film reached 95° C. and stretched at 95° C. in a widthwise direction (in a lateral direction) to an extent of 4.0-fold.

After that, the film after the lateral stretching was introduced into the final heat-treating zone, subjected to a thermal treatment for 5.0 seconds at the temperature of 85° C. in said final heat-treating zone and cooled and both ends were cut and removed so as to make the width of film 500 mm, followed by winding up in a roll whereupon a biaxially stretched film in the thickness of about 20 μm was continuously prepared in a predetermined length. The characteristics of the resulting film were evaluated according to the above-mentioned methods. Result of the evaluations is shown in Table 3. It was a film having good cutting property and good finish upon shrinking.

Example 2

Film in the thickness of 20 μm was prepared by the same method as in Example 1 except that the polyester B was changed to the polyester C. Tg of the non-stretched film was 67° C. Result of the evaluations is shown in Table 3. It was a film having good cutting property and good finish upon shrinking.

Example 3

Film in the thickness of 20 μm was prepared by the same method as in Example 1 except that the thickness of the non-stretched film was made 175 μm and the annealing treatment after the longitudinal stretching was conducted with a relaxing rate of 40%. Result of the evaluations is shown in Table 3. It was a film having good cutting property and good finish upon shrinking.

Example 4

Polyester A, polyester A2, polyester B and polyester D were mixed in a ratio of 5:30:55:10 by weight. Tg of the non-stretched film was 67° C. Film in the thickness of 20 μm was prepared by the same method as in Example 1 except that the thickness of the non-stretched film was made 168 μm and temperature and magnification in the longitudinal stretching step, temperature in the lateral stretching step and temperature in the intermediate thermal treatment were changed. Result of the evaluations is shown in Table 3. It was a film having good cutting property and good finish upon shrinking.

Example 5

Film in the thickness of 20 μm was prepared by the same method as in Example 1 except that the thickness of the non-stretched film was made 233 μm and temperature and relaxing rate in the annealing step were changed. Result of the evaluations is shown in Table 3. It was a film having good cutting property and good finish upon shrinking.

Example 6

Film in the thickness of 20 μm was prepared by the same method as in Example 1 except that the thickness of the non-stretched film was made 146 μm and the annealing treatment after the longitudinal stretching was conducted with a relax rate of 50%. Result of the evaluations is shown in Table 3. It was a film having good cutting property and good finish upon shrinking.

Example 7

Film in the thickness of 20 μm was prepared by the same method as in Example 1 except that the thickness of the non-stretched film was made 168 μm, the longitudinal stretching magnification in the first stage and that in the second stage were made 3-fold and 1.4-fold, respectively whereby the total longitudinal stretching magnification was made 4.2-fold, the annealing treatment after the longitudinal stretching of the longitudinally stretched film was conducted with a relax rate of 50% and the intermediate thermal treatment was conducted at the temperature of 145° C. for 5.0 seconds. Result of the evaluations is shown in Table 3. It was a film having good cutting property and good finish upon shrinking.

Example 8

Film in the thickness of 20 μm was prepared by the same method as in Example 7 except that thickness of the non-stretched film was made 202 μm and the annealing treatment after the longitudinal stretching was conducted with a relax rate of 40%. Result of the evaluations is shown in Table 3. The resulting film was good in terms of transparency and cutting property as compared with that in Example 7.

Comparative Example 1

The above-mentioned polyester A, polyester A2, polyester B and polyester D were mixed in a ratio of 5:5:80:10 by weight and poured into an extruder. After that, the mixed resin was melted at 280° C., extruded from a T die and wound around a rotating metal roll where the surface temperature was cooled down to 30° C. so as to quickly cool whereupon a non-stretched film in the thickness of 291 μm was prepared. The pulling out speed (rotating speed of the metal roll) of the non-stretched film at that time was about 20 m/min. Tg of the non-stretched film was 67° C.

The non-stretched film prepared as above was introduced into a longitudinal stretching machine where plural roll groups were continuously arranged and stretched in two stages in a longitudinal direction utilizing the difference in the rotating speeds of the rolls. Thus, after the non-stretched film was subjected to a preliminary heating on a pre-heating roll until the film temperature reached 78° C., it was stretched to an extent of 2.6-fold utilizing the difference in the rotating speeds between a low-speed rotating roll where the surface temperature was set at 78° C. and a medium-speed rotating roll where the surface temperature was set at 78° C. (the first longitudinal stretching stage). After that, the longitudinally stretched film was subjected to a further longitudinal stretching to an extent of 1.4-fold utilizing the difference in the rotating speeds between a medium-speed rotating roll where the surface temperature was set at 95° C. and a high-speed rotating roll where the surface temperature was set at 30° C. (the second longitudinal stretching stage). (Accordingly, the total longitudinal stretching magnification was 3.64-fold.)

The film after the above-mentioned longitudinal stretching was compulsorily cooled at the cooling speed of 40° C. per second using a cooling roll (a high-speed roll positioned immediately after the longitudinal stretching roll in the second stage) where the surface temperature was set at 30° C. and the film after the cooling was introduced into a tenter and continuously passed through intermediate heat-treating zone, first intermediate zone (naturally cooling zone), cooling zone (compulsorily cooling zone), second intermediate zone, lateral stretching zone and final heat-treatment zone. In the tenter, length of the first intermediate zone was set at about 40 cm and a shielding plate was installed in each of the areas between the intermediate heat-treating zone and the first intermediate zone, between the first intermediate zone and the cooling zone, between the cooling zone and the second intermediate zone and between the second intermediate zone and the lateral stretching zone. Further, in the first intermediate zone and the second intermediate zone, hot wind from the intermediate heat-treating zone, cooling wind from the cooling zone and hot wind from the lateral stretching zone were shut out so that, when the paper pieces in stripes were hung down in such a state where no film was passed, the paper pieces were hung down in an almost completely vertical direction. In addition, the distance between the film and the shielding plate was adjusted in such a manner that, during the stage when the film passed, most of the accompanying flow as a result of the flow of the film is shut out by a shielding plate located between the intermediate heat-treating zone and the first intermediate zone. Moreover, the distance between the film and the shielding plate was adjusted in such a manner that, during the stage when the film passed, most of the accompanying flow as a result of the flow of the film is shut out by the shielding plate at the boundary between the intermediate heat-treating zone and the first intermediate zone and between the cooling zone and the second intermediate zone.

Then, the longitudinally stretched film introduced into a tenter was firstly subjected to a thermal treatment for 5.0 seconds at the temperature of 160° C. in the intermediate heat-treating zone and the film after the intermediate thermal treatment was introduced into the first intermediate zone and passed through said zone (passing time: about 1.0 second) to subject to a natural cooling. After that, the film after the natural cooling was introduced into a cooling zone, low-temperature wind was blown thereto until the surface temperature of the film reached 100° C. to positively conduct a compulsory cooling and the film after the cooling was introduced into the second intermediate zone and passed through said zone (passing time: about 1.0 second) to subject to the natural cooling once again. Further, the film after passing through the second intermediate zone was introduced into a lateral stretching zone, subjected to a preliminary heating until the surface temperature of the film reached 95° C. and stretched at 95° C. in a widthwise direction (in a lateral direction) to an extent of 4.0-fold.

After that, the film after the lateral stretching was introduced into the final heat-treating zone, subjected to a thermal treatment for 5.0 seconds at the temperature of 85° C. in said final heat-treating zone and cooled and both ends were cut and removed so as to make the width of film 500 mm, followed by winding up in a roll whereupon a biaxially stretched film in the thickness of about 20 μm was continuously prepared in a predetermined length. The characteristics of the resulting film were evaluated according to the above-mentioned methods. Result of the evaluations is shown in Table 3. The result was that, although the cutting property was good, the unevenness of the shrinking was a bit inferior.

Comparative Example 2

An non-stretched film in the thickness of 80 μm which was prepared by the same manner as in Example 1 except that the discharged amount was changed was subjected to a preliminary heating until the surface temperature of the film reached 75° C. and then subjected to a monoaxial lateral stretching in a widthwise direction (in a lateral direction) at 75° C. to an extent of 4.0-fold. After that, the film after the lateral stretching was introduced into the final heat-treating zone, subjected to a thermal treatment in said final heat-treating zone at the temperature of 85° C. for 5.0 seconds and cooled, both ends were cut and removed so as to make the width of film 500 mm, followed by winding up in a roll whereupon a monoaxially-laterally stretched film in the thickness of about 20 μm was continuously prepared in a predetermined length. Characteristics of the resulting film were evaluated according to the above-mentioned methods. Result of the evaluations is shown in Table 3. The result was that, although the unevenness in shrinking was good, a cutting property was inferior to the products of Examples.

Comparative Example 3

Film in the thickness of 20 μm was prepared by the same method as in Example 1 except that the thickness of the non-stretched film was made 277 μm and the relaxing rate in the annealing treatment was made 5%. Result of the evaluations is shown in Table 3. The result was that, although the cutting property was good, the unevenness of the shrinking was a bit inferior.

Comparative Example 4

Film in a thickness of 20 μm was prepared by the same method as in Example 1 except that thickness of the non-stretched film was made 202 μm and that the film after annealing was stretched in a tenter to an extent of 4-fold at the stretching temperature of 80° C. without an intermediate thermal treatment and subjected to the final thermal treatment at 80° C. Result of the evaluations is shown in Table 3. As compared with the product in Example 1, the resulting film had a high thermal shrinking rate in hot water in the lengthwise direction at 90° C. and had a bad strain by shrinking.

Results of the evaluations on Examples and Comparative Examples are shown in Table 3.

TABLE 3

| | Thickness (μm) | Thermal shrinking rate in hot water 90° C. | | 80° C. Thermal shrinking rate difference (%) | Right-angle tear strength (N/mm) | Elmendorf tear loads (mN) | | Elmendorf ratio | Tensile breaking strength (MPa) Lengthwise direction |
|---|---|---|---|---|---|---|---|---|---|
| | | Widthwise direction | Lengthwise direction | | | Main shrinking direction | Orthogonal direction | | |
| Example 1 | 20 | 54 | 6 | 4 | 245 | 270 | 340 | 0.79 | 210 |
| Example 2 | 20 | 55 | 6 | 4 | 240 | 270 | 330 | 0.82 | 205 |
| Example 3 | 20 | 58 | 5 | 6 | 270 | 260 | 430 | 0.60 | 175 |
| Example 4 | 20 | 49 | 6 | 4 | 290 | 260 | 520 | 0.50 | 210 |
| Example 5 | 20 | 52 | 5 | 5 | 230 | 270 | 340 | 0.79 | 195 |
| Example 6 | 20 | 60 | 3 | 10 | 300 | 250 | 400 | 0.50 | 130 |
| Example 7 | 20 | 60 | 4 | 14 | 210 | 290 | 310 | 0.94 | 220 |
| Example 8 | 20 | 58 | 6 | 12 | 200 | 300 | 290 | 1.03 | 250 |
| Comparative Example 1 | 20 | 57 | 8 | 1.5 | 210 | 280 | 310 | 0.90 | 220 |
| Comparative Example 2 | 20 | 60 | 5 | 4 | 420 | 210 | 3300 | 0.06 | 70 |
| Comparative Example 3 | 20 | 55 | 8 | 2.5 | 220 | 280 | 320 | 0.88 | 210 |
| Comparative Example 4 | 20 | 64 | 19 | 2 | 280 | 250 | 280 | 0.89 | 180 |

| | Unevenness in thickness (%) | | Haze (%) | Dynamic friction coefficient | Close adhesion property of label | Strain by shrinkage | Rejected rate in opening ability along perforation (%) |
|---|---|---|---|---|---|---|---|
| | Main shrinking direction | Orthogonal direction | | | | | |
| Example 1 | 6.2 | 7 | 6.5 | 0.46 | ○ | ○○ | 8 |
| Example 2 | 7.4 | 7.5 | 6 | 0.43 | ○ | ○○ | 8 |
| Example 3 | 9.8 | 7.5 | 4.1 | 0.42 | ○ | ○○ | 12 |
| Example 4 | 8.5 | 9.0 | 7.0 | 0.41 | ○ | ○○ | 10 |
| Example 5 | 9.0 | 8 | 6.2 | 0.44 | ○ | ○○ | 8 |
| Example 6 | 9 | 8.5 | 5.8 | 0.42 | ○ | ○○ | 14 |
| Example 7 | 7 | 8.5 | 4.8 | 0.45 | ○ | ○○ | 6 |
| Example 8 | 5.5 | 8 | 3 | 0.42 | ○ | ○○ | 4 |
| Comparative Example 1 | 6.1 | 6.5 | 7.5 | 0.43 | ○ | ○ | 8 |
| Comparative Example 2 | 5 | 5.5 | 6 | 0.52 | ○ | ○○ | 40 |
| Comparative Example 3 | 6.5 | 7 | 6.5 | 0.46 | ○ | ○ | 8 |
| Comparative Example 4 | 5.8 | 6.5 | 3.5 | 0.48 | ○ | x | 12 |

INDUSTRIAL APPLICABILITY

Since the thermally shrinkable film according to the present invention has the excellent processing characteristics as mentioned above, it can be advantageously used for the use as a label for a bottle or the like. Also, a packed product such as a bottle, etc. prepared by using the film as a label shows a beautiful appearance.

The invention claimed is:

1. A thermally shrinkable polyester film, comprising:
polyester resin comprising ethylene terephthalate as a main component and not less than 13 molar % of one or more monomer components which can become non-crystalline wherein the thermally shrinkable polyester film fulfills the following requirements (1) to (4):
(1) the difference in the thermal shrinking rate in hot water in the widthwise direction of the film when treated in hot water at 80° C. for 10 seconds and for 3 seconds is 3% to 15%;
(2) the thermally shrinking rate in hot water in the widthwise direction and in the lengthwise direction when treated in hot water at 90° C. for 10 seconds are 40% to 80% and 0% to 12%, respectively;
(3) the right-angle tear strength in the lengthwise direction per unit thickness after shrunk to an extent of 10% in the widthwise direction in hot water at 80° C. is 180 N/mm to 310 N/mm; and
(4) the tensile breaking strength in the lengthwise direction is 90 MPa to 300 MPa,
wherein the thermally shrinkable polyester film is prepared by steps (a) to (g):
(a) a longitudinal stretching step where the non-stretched polyester film is stretched in 2.2-fold to 3.0-fold in a lengthwise direction at the temperature of Tg to (Tg+30°

C.) and then stretched in 1.2-fold to 1.5-fold in a lengthwise direction at the temperature of (Tg+10° C.) to (Tg+40° C.) whereupon the longitudinal stretch is done to make the total stretching magnification 2.8-fold to 4.5-fold;

(b) an annealing step at a film temperature of (Tg+10° C.) to (Tg+40° C.) where the film after the longitudinal stretching is subjected to relax of 20% to 50% in the lengthwise direction together with heating in the widthwise direction using an infrared heater;

(c) an intermediate thermal treating step where the film after the annealing is subjected to a thermal treatment for 1.0 second to 9.0 seconds at the temperature of 130° C. to 190° C. in a state of being held by clips at the both ends in the widthwise direction in a tenter;

(d) a natural cooling step where the film after the intermediate thermal treatment is passed through an intermediate zone where it is shut out from the heating zone of each step and no positive heating operation is conducted whereupon a natural cooling is done;

(e) a compulsory cooling step where the film after the natural cooling is positively cooled down until the surface temperature reaches 80° C. to 120° C.;

(f) a lateral stretching step where the film after the compulsory cooling is stretched in 2.0-fold to 6.0-fold in a widthwise direction at the temperature of (Tg+10° C.) to (Tg+40° C.); and (g) a final thermal treating step where the film after the lateral stretching is subjected to a thermal treatment for 1.0 second to 9.0 seconds at the temperature of 80° C. to 130° C. in a state of being held by clips at both ends in the widthwise direction in a tenter.

2. The thermally shrinkable polyester film according to claim 1, wherein when the Elmendorf tear loads in the widthwise and the lengthwise directions after shrunk to an extent of 10% in the widthwise direction in hot water of 80° C. were measured, the Elmendorf ratio is 0.3 to 1.5.

3. The thermally shrinkable polyester film according to claim 1, wherein the thermally shrinkable polyester film has a thickness of 10 μm to 70 μm and a haze of 2.0 to 13.0.

4. The thermally shrinkable polyester film according to claim 1, wherein the thermally shrinkable polyester film has a dynamic friction coefficient of 0.1 to 0.55.

5. The thermally shrinkable polyester film according to claim 1, wherein the majority of the monomers which can become non-crystalline is neopentyl glycol, 1,4-cyclohexane dimethanol, or isophthalic acid.

6. The thermally shrinkable polyester film according to claim 2, wherein the thermally shrinkable polyester film has a thickness of 10 μm to 70 μm and a haze of 2.0 to 13.0.

7. The thermally shrinkable polyester film according to claim 6, wherein the thermally shrinkable polyester film has a dynamic friction coefficient of 0.1 to 0.55.

8. The thermally shrinkable polyester film according to claim 7, wherein the majority of the monomers which can become non-crystalline is neopentyl glycol, 1,4-cyclohexane dimethanol, or isophthalic acid.

9. The thermally shrinkable polyester film according to claim 2, wherein the thermally shrinkable polyester film has a dynamic friction coefficient of 0.1 to 0.55.

10. The thermally shrinkable polyester film according to claim 9, wherein the majority of the monomers which can become non-crystalline is neopentyl glycol, 1,4-cyclohexane dimethanol, or isophthalic acid.

11. The thermally shrinkable polyester film according to claim 3, wherein the thermally shrinkable polyester film has a dynamic friction coefficient of 0.1 to 0.55.

12. The thermally shrinkable polyester film according to claim 11, wherein the majority of the monomers which can become non-crystalline is neopentyl glycol, 1,4-cyclohexane dimethanol, or isophthalic acid.

13. The thermally shrinkable polyester film according to claim 2, wherein the majority of the monomers which can become non-crystalline is neopentyl glycol, 1,4-cyclohexane dimethanol, or isophthalic acid.

14. The thermally shrinkable polyester film according to claim 3, wherein the majority of the monomers which can become non-crystalline is neopentyl glycol, 1,4-cyclohexane dimethanol, or isophthalic acid.

15. The thermally shrinkable polyester film according to claim 4, wherein the majority of the monomers which can become non-crystalline is neopentyl glycol, 1,4-cyclohexane dimethanol, or isophthalic acid.

16. A packed product comprising a thing with an outer surface coated at least in part with the thermally shrinkable polyester film of claim 1 as a base material and a label where perforation or a pair of notches is formed on the base material, wherein the thermally shrinkable polyester film has been subjected to thermal shrinking on the thing.

17. A packed product comprising a thing with an outer surface coated at least in part with the thermally shrinkable polyester film of claim 8 as a base material and a label where perforation or a pair of notches is formed on the base material, wherein the thermally shrinkable polyester film has been subjected to thermal shrinking on the thing.

* * * * *